United States Patent
Enigma et al.

(10) Patent No.: US 10,630,768 B1
(45) Date of Patent: Apr. 21, 2020

(54) CONTENT-BASED MEDIA COMPRESSION

(71) Applicant: Amazon Technologies, Inc., Reno, NV (US)

(72) Inventors: Brian Enigma, Portland, OR (US); Michael Kale, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 640 days.

(21) Appl. No.: 15/228,749

(22) Filed: Aug. 4, 2016

(51) Int. Cl.
*H04L 29/08* (2006.01)
*H04L 29/06* (2006.01)

(52) U.S. Cl.
CPC .......... *H04L 67/1008* (2013.01); *H04L 65/60* (2013.01); *H04L 65/607* (2013.01); *H04L 67/02* (2013.01); *H04L 67/20* (2013.01); *H04L 69/04* (2013.01)

(58) Field of Classification Search
CPC ..... H04L 67/1008; H04L 67/02; H04L 67/20; H04L 65/60; H04L 65/607; H04L 69/04
USPC ......................................................... 709/226
See application file for complete search history.

(56) References Cited

U.S. PATENT DOCUMENTS

| | | | | | |
|---|---|---|---|---|---|
| 6,014,491 | A | * | 1/2000 | Hair | G11B 27/031 386/234 |
| 7,564,861 | B1 | * | 7/2009 | Subbiah | H03M 7/30 370/428 |
| 8,295,681 | B2 | * | 10/2012 | Hair | G11B 27/031 386/263 |
| 2013/0177294 | A1 | * | 7/2013 | Kennberg | H04N 21/21805 386/241 |
| 2013/0308919 | A1 | * | 11/2013 | Shaw | H04N 21/2221 386/239 |
| 2015/0256863 | A1 | * | 9/2015 | Choi | H04N 19/463 375/240.01 |

* cited by examiner

*Primary Examiner* — Michael C Lai
(74) *Attorney, Agent, or Firm* — Hogan Lovells US LLP (57) ABSTRACT

The playback of a media file can be adjusted for portions where the content may be of less interest to a viewer. The audio content can be analyzed to locate portions of the media file that might be appropriate for compression, such as during periods of relative silence. Information for the beginning or end of such a period can be stored as compression cues associated with the media file. During an encoding of the file, the compression cues and associated time code data can be used to incorporate playback adjustment information in the media file. A player playing the media file can determine whether to adjust the playback based on this information, such as to increase a frame rate of the playback during periods of silence and return the frame rate to a standard rate for the media file at the end of those periods.

20 Claims, 7 Drawing Sheets

ID: "CONTENT-BASED MEDIA COMPRESSION"

BACKGROUND

Users are increasingly accessing a variety of media content electronically using a variety of different devices and applications. In many instances the media content will include both audio and video content, and there may be portions of the content that are of lesser interest to a viewer than other portions. For example, there may be periods of silence in the audio portion that may be of little interest to the user, such as where a presenter is pausing between topics or thoughts. For audio content alone, these periods of silence can be removed in order to reduce the amount of time needed to listen to the content. Cutting out portions of a multimedia file will result in jump cuts in the video presentation, however, which might be distracting for the user. Further, the video content during these times may be of lesser interest, but the viewer might still want to ensure that nothing is missed by completely bypassing those portions that contain relative silence.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the presentation of media files. In particular, various approaches provide the ability to adjust playback for certain portions of a media file, such as portions where the audio channel contains relative silence or other such characteristics. In some embodiments, a first processing step for a media file can involve analyzing the audio content to locate portions of the content that might be appropriate for compression, such as periods of at least a minimum length during which the amplitude or volume of the audio content satisfies at least one silence criterion. Information such as the time code where the period begins or ends, as well as an indication of whether a time code corresponds to the beginning or end of such a period, can be stored as compression cues or other indicators associated with the media file. During an encoding of the media file, or another such process, the compression cue and time code data can be used to incorporate playback adjustment instructions or information in the media file itself. The information can include instructions on how to adjust playback, or compression cue data that can enable a player to dynamically adjust playback, among other such options. A player playing the media file can then determine whether to adjust the playback based on this information, such as to increase a frame rate of the playback during periods of silence, and return the frame rate to a standard rate for the media file at the end of those periods. Various transitions can be used as well to prevent the adjustment from being jarring or distracting to a user. The increase in frame rate enables the video content to remain visible while reducing the amount of time spent presenting periods of silence, which can be particularly advantageous for content such as discussions or presentations.

Various other such functions can be used as well within the scope of the various embodiments as would be apparent to one of ordinary skill in the art in light of the teachings and suggestions contained herein.

Figure 1:
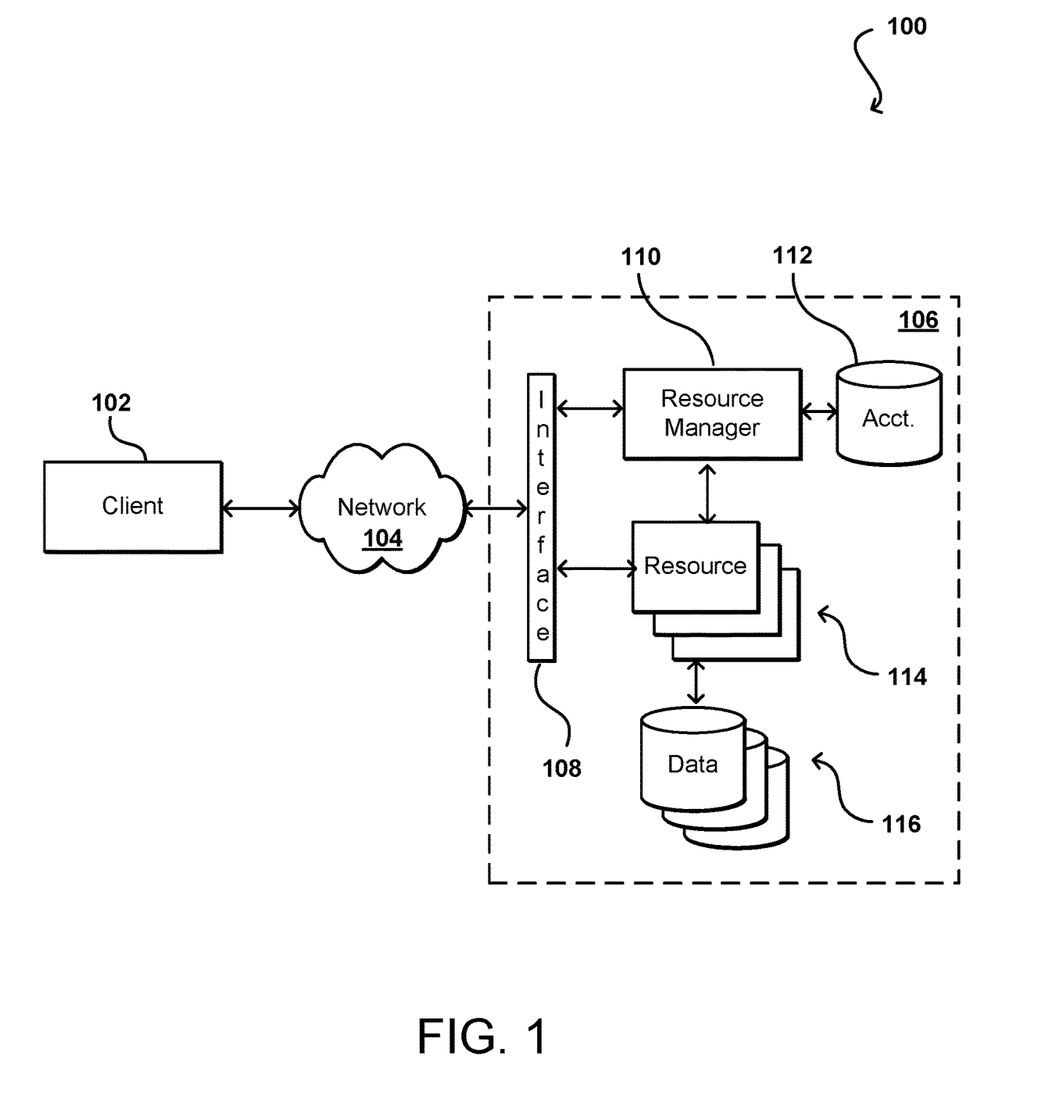
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
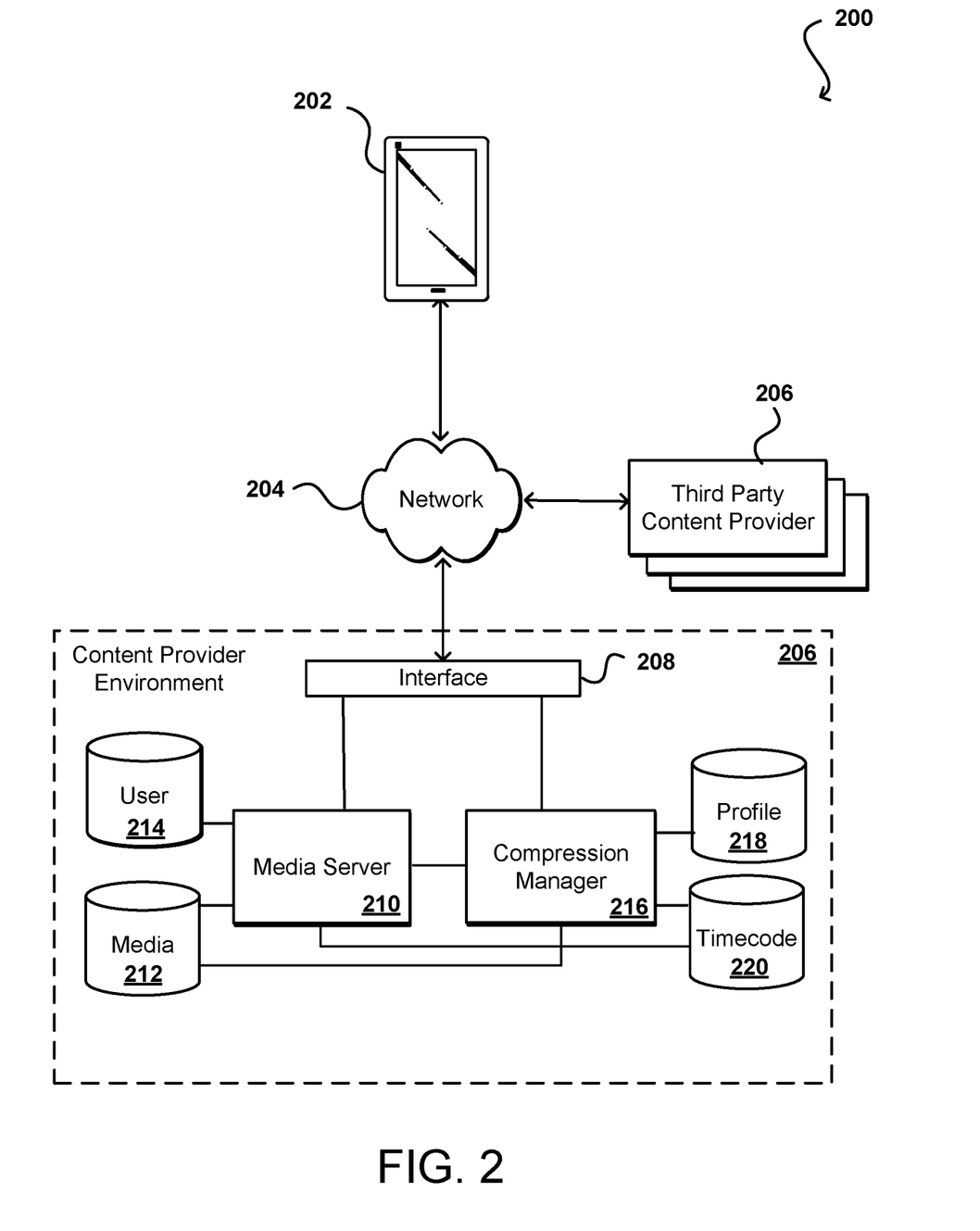
FIG. 2 illustrates an example subsystem for managing media compression that can be utilized in accordance with various embodiments.

The various resources can include media servers 210 that can be used to stream or otherwise transmit media files to one or more client devices 202, or other such destinations, such as is illustrated in the example implementation 200 of FIG. 2. In this example, a client device 202 can submit a request for content across the one or more networks 204 that will be received by an interface (e.g., an API) of an interface layer 208 of a content provider environment 206. As known for network environments, the interface layer can include components such as various interfaces, load balancers, request and/or data routers, and the like. The network(s) can include any appropriate network, such as the Internet, a local area network (LAN), a cellular network, an Ethernet, or other such wired and/or wireless network. The content provider environment 206 can include any appropriate resources for providing content from a resource provider, as may include various servers, data stores, and other such components known or used for providing content from across a network (or from the "cloud"). As mentioned elsewhere herein, the client computing device 202 can be any appropriate computing or processing device, as may include a desktop or notebook computer, smartphone, tablet, wearable computer (i.e., smart watch, glasses, or contacts), set top box, or other such system or device.

Information for the request can be directed to an appropriate media server 210, which can cause the media content to be transmitted to the client device 202 from an appropriate media repository 212. In at least some embodiments the media server 210, or another component or process in the content provider environment 206, can first verify that the providing of the content to the client device is permissible according to rights that might be associated with a user of the client device, for example, as determined by comparing information for the request against user profile or permission data stored in a user data repository 214 or other such location. Rights management may also be performed using a third party service in at least some embodiments.

As mentioned, however, it can be advantageous in at least some situations to reduce the amount of media content transmitted to, or displayed by, the client device 202 receiving the content. One advantage is that the reduction in the amount (i.e., presentation length) of content can require less memory to store on the client device and/or fewer resources for playback. The shorter length will also save the viewer time in viewing the content and obtaining the relevant information. Similarly, a smaller media file would require less bandwidth to transmit, saving resources and costs for the content provider and the viewer, as well as any network provider there between. The ability to reduce the impact of less important portions of the content can also have the advantage of making users more likely to obtain other media files from that provider. Various other advantages can be obtained as well through implementation of the various embodiments.

One way to reduce the amount of time necessary to display a media file is to determine which portions of the media file may be of less interest, importance, or relevance for a user. In some embodiments, this can include determining portions of relative silence or "dead air" in an audio channel of the media file. For example, the frame rate of the media file could be increased (or various frames skipped) during periods of silence, in order to decrease the amount of time needed for playback when information is not being conveyed through the presentation. This can be particularly advantageous for meetings, presentations, or lectures, for example, where the relevant content will mostly be provided through spoken or audio communication, and it may be desirable to spend less time playing back periods of silence. Experimental data has shown that reducing the periods of silence in a typical conversation or presentation can reduce the period of time needed for playback down by up to a third of the length of the presentation, although reductions can vary widely based on a number of different factors.

In order to provide for this compression or reduction in playback time, it can be necessary in at least some embodiments to analyze the content of the media to determine locations where compression may be beneficial. This can include, for example, determining portions of the media file during which the audio volume or variation during playback is below a minimum threshold, such as where there is only a limited amount of background noise present in the audio channel. In at least some embodiments, this can involve an initial playback or analysis to determine locations where the audio satisfied such a criterion. While in some embodiments the analysis can be performed in real time by a media player application or other such component, as playback is occurring, it can be desirable in at least some situations to only perform compression when the period of silence lasts for at least a minimum period of time, such as at least one or two seconds to avoid compression during normal speech or presentation periods. Such an approach can involve analysis over a sliding window of time, such as a period of two to five seconds. When streaming the content, however, it can be impractical at best to buffer sufficient content to enable the compression to be performed on an ongoing basis.

Accordingly, approaches in accordance with various embodiments can perform an initial, offline processing of the media content in order to determine the location of various compression cues indicating locations where the playback of content can be adjusted. These cues can include, for example, locations where a period of silence begins or ends, indicating a portion of the media file where compression could be applied advantageously. Other such cues can be determined as well within the scope of the various embodiments. For example, periods with certain music, audio signals, speech patterns, or other audio patterns or characteristics might be identified as locations for potential compression as well. While periods of silence might be less important for lectures where viewers are interested in what the presenter has to say and not in periods of silence, presentations of golf or chess tournaments where there is little to no discussion during the action, such that period of silence might be preferred, can be utilized as locations for compression as well. Similar approaches can be used where the user is interested in portions of the content with music, such as for a concert playback, or portions without music, such as where the user is not interested in commercials or periods of transition or introduction, etc. Various other audio cues can be identified as well within the scope of the various embodiments.

In at least some embodiments the locations of the audio cues (or other compression cues) in a media file can be determined using a compression manager 216 or other such component, system, or service. The compression manager can include, or work with, an audio decoder or other such mechanism to separate and analyze the audio data to determine the locations of the audio cues and track those locations using time codes or another such mechanism. Time codes can refer to a sequence of numeric codes generated at regular intervals in order to synchronize different portions or channels of the media content, as may include the audio component, the video component, and any additional textual component, among other potential components. A sequence of time codes can be integrated into the media file upon creation or editing of the media file. In many media applications, time codes such as SMPTE time codes are utilized for purposes such as synchronization, as well as for identifying material and locations in the media file. SMPTE time codes can be encoded in a variety of different formats, as may include linear time codes (LTCs), vertical interval time codes (VITCs), and control track (CTL) time codes, among others. In some embodiments keykodes may also be used to identify specific frames in the video content. Other codes can be used or processed as well within the scope of the various embodiments.

An initial pass through the media content can identify the locations of various compression cues that can be used to adjust, for example, playback and/or transmission of the media content. For each compression cue, a corresponding time code or other identifier for the location in the media content can be identified. For purposes of clarity, in at least some embodiments the "location" or a cue in the media file refers to a portion of the file that would be played back or presented at a specific time or location along a playback timeline. For example, a location of "5:00" might designate to a frame that would be displayed and audio content that would be presented for playback at the 5:00 mark of playback of the media file. As known for media files presented through digital players, for example, a user can move the playback to a specific location or time along the presentation timeline, such as to a frame or position in the audio track that corresponds to the 5:00 time code or position along the playback timeline. The physical storage location of data corresponding to the time code or playback location can vary among embodiments, and different portions of the media corresponding to that time code can be stored in different physical locations as well in some embodiments. The time codes and/or compression cue data can be stored in a location accessible to the compression manager 216, such as in a time code repository 220 or other such location. These time codes can then be used by an encoder, to encode a media file, or a media server 210 to send with a media file in order to allow for the compression. The encoder can also be part of the media server or another such system or service for purposes of properly encoding a media file. In some embodiments profile data for a user or client device, and stored to a profile data store 218 or other such location, can determine the type of compression to be used and an extent of the compression, among other such factors.

Figure 3A:
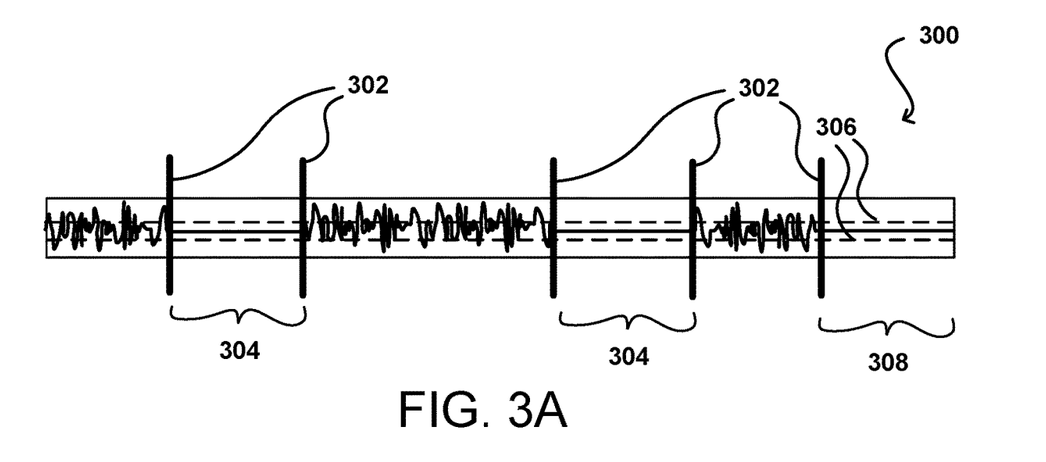
FIGS. 3A, 3B, and 3C illustrate an example media compression approach that can be utilized in accordance with various embodiments.

FIG. 3A illustrates an example audio signal 300, or audio channel or portion of a media file, that can be analyzed in accordance with various embodiments. In this example, the audio channel can be analyzed separately from the other channels for a media file, although in other embodiments all channels might be analyzed together, among other such options. The signal plotted in FIG. 3A illustrates variations in amplitude (measured in units such as Newtons per square meter) and frequency (typically measured in Hz) of the sound signal over a period of playback of the media file. In the audio signal, there will be portions where there are audio sources such as spoken words, singing, music, and/or other such sources causing changes in the amplitude and frequency of the sound signal that lead to variations in the sound produced during playback. During periods of relative silence, there may be very little variation in the amplitude and frequency, with the amplitude potentially falling within a specified threshold range. The threshold of hearing (or human perceptibility) is generally determined to be approximately 0.00002 N/m$^2$ for a 1 kHz tone. The amplitude of an audio presentation will also generally be around 60 N/m$^2$ although the value can vary considerably based upon various factors.

In analyzing the audio signal 300 in FIG. 3A, it can be seen that there are periods 304 of time during the playback when the amplitude of the audio signal falls within a given amplitude range, as may be defined by upper and lower amplitude thresholds 306. There will likely be some small amplitude variations due to background noise and even digital noise generated through the audio capture and encoding process. Accordingly, it can be desirable to set thresholds that may be at least at the perceptible amplitude values but in many embodiments will be sufficient to filter out background noise from actual audio content that might be of interest to a user. Accordingly, silence thresholds such as +/−0.0001 N/m$^2$ or +/−0.01 N/m$^2$ for a 1 kHz tone might be specified in accordance with various embodiments, although various other thresholds can be set as well as may be appropriate for the particular implementation. During an analysis of the audio signal, it can be desirable to determine where periods of "silence" where the amplitude falls below, or within, the threshold range, and track the locations as compression cues 302 that indicate the beginning and end of each such period 304.

As mentioned, however, it can be desirable to avoid compressing the media for small breaks or pauses in between words or sentences, musical beats, and the like. Thus, a minimum time threshold might also be set wherein portions of the signal that remain within the silence value range for at least that time threshold are considered as periods of silence for purposes of compression, but portions of the signal that do not remain within the silence value range for at least the time threshold are not considered as periods of silence. In some embodiments, one or more spikes in the audio signal that fall outside the silence value range may be allowable in order to allow for some amount of noise in the silence periods, although duration, amplitude value, or another threshold on its parameter values may determine its effect on the silence determination.

In the example audio signal 300 of FIG. 3A, a number of compression cues 302 have been determined for the audio signal, where each compression cue corresponds to a location (i.e., time code) in the audio signal where a period of silence begins or ends. These can include periods 304 with defined beginning and end compression cues, as well as a period 308 where there is an initial compression cue and there is silence until the end of the audio signal. As illustrated, during each of these periods of relative silence the amplitude of the audio signal is within the threshold range 306 and the period of silence lasts for an extended period of time (e.g., more than 5-10 milliseconds or even 1-2 seconds). Accordingly, each of these periods 304, 308 can be identified as potential compression periods for all channels of the audio.

Figure 3B:
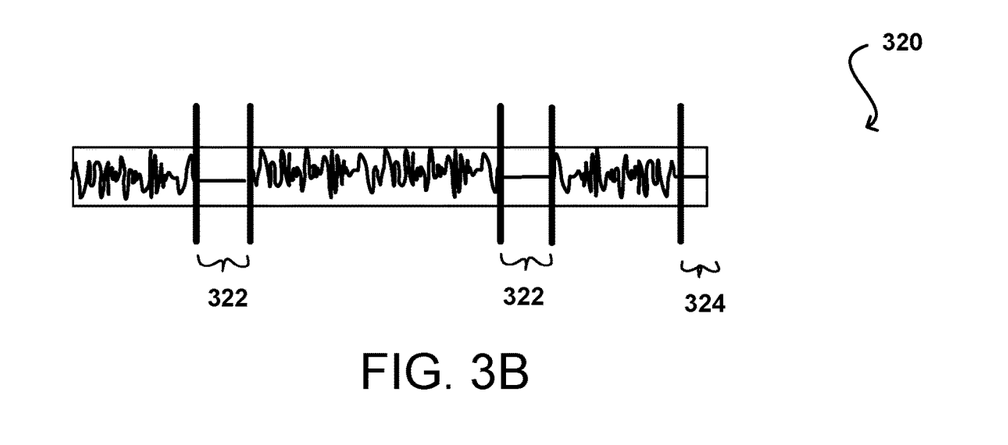

FIG. 3B illustrates an example audio signal 320 that corresponds to the audio signal 300 of FIG. 3A, but with portions 322, 324 that correspond to the silence portions 304, 308 being compressed. This compression can be performed at playback, when generating a file to send for playback, or when generating a compressed version of the file, among other such options. In this example, the silence portions have been compressed but the other portions of the file have been left as is. In this way, the portions of the audio signal with actual content can be presented as intended, but the periods without content can be compressed in order to reduce the amount of time during which content is not being presented. As illustrated, such compression has significantly reduced the overall length of the audio signal. In this example the reduction was slightly more than a quarter of the length, although differences in length reduction can depend at least in part upon the type of content and presentation, among other such options. Such reduction in length can increase the overall usefulness to the viewer, as the viewer is able to obtain the content in a shorter amount of time, and also helps to conserve resources on the display device as the shorter playback time saves energy and resource consumption time on the device. In situations where the compression involves less data being transmitted to the device, the compression can also save in storage and bandwidth, among other such resources.

Various approaches can be used to provide the compression in accordance with various embodiments. The selection of compression technique can depend at least in part upon how the content is to be stored and delivered to the various viewing devices. For example, it might be the case that a content provider wants to offer a standard version and a compressed version, and thus might generate and store two versions of the content that can be provided to different devices. It might alternatively be the case that the provider only wants to store and provide one version of the content, but wants the viewer to be able to control the amount of compression of the media content. Other cases can exist as well. The decision can also depend in part upon the type of content. For example, if the media content relates to a presentation or speech where there is little to no video content provided during the periods of silence then the provider might decide to drop video frames or reduce the amount of content provided during those periods. In situations where there might be content of interest during the video portions, such as where a person might be performing a task being explained, then it might be desirable to show all the video content but at a faster frame rate in order to enable the video to be displayed but reduce the overall presentation time. For media content where audio is provided for a single video image, such as for a podcast where the only video is a title card, the compression might involve removing or deleting entire portions of the media file such that only portions with audio content are included, with some small period of audio break remaining in order to maintain context and natural flow and feel of the audio content.

Figure 3C:
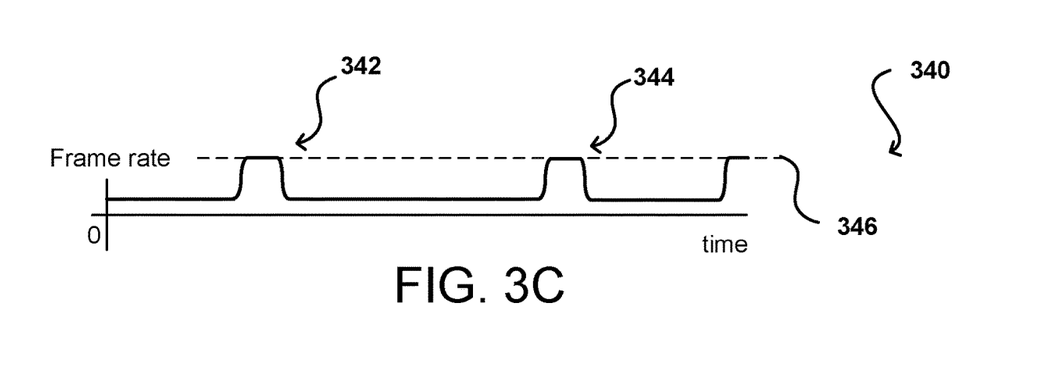

FIG. 3C illustrates one example approach to adjusting the frame rate 340 that can be utilized in accordance with various embodiments. In this example, the frame rate of the presentation (or other speed with which the video and related media content is displayed) can be increased to a determined compression frame rate value 346, which might go from 30 or 60 frames per second to 120 frames per second (fps) or another such value, depending on factors such as the type of content and user preferences, among other such factors discussed elsewhere herein. In some embodiments the relevant frame rate might depend at least in part upon the length of the period of silence, in order to maximize the reduction of dead air present in the playback but minimize the potential loss of video content during shorter periods that may not represent a significant break in the audio presentation. The increase in frame rate can be appreciable, in order to meaningfully decrease the amount of time spend presenting the periods of silence, but can be low enough that any content displayed during those periods can still be comprehended by the user. For example, if a presenter in the media content is discussing how to build a cabinet, and during the periods of silence the presenter might be hammering, sawing, finishing, or performing other such tasks that may be of lesser interest than the explanation, but may still have some value in being presented to the user. Similarly, a frame rate increase that is too great can be unpleasant for the viewer, as the viewer is unable to determine what is occurring during that period of time and, in at least some instances, may cause the presentation to be of lesser value to the viewer than if the media had not been compressed.

Accordingly, in at least some embodiments there can be a "ramp up" period and a "ramp down" period with respect to the frame rate. The "ramp up" period can be a period of determined length wherein the frame rate moves from the designated playback speed, such as at 30 fps to a determined compression speed, such as 120 fps. The increase can take any of a number of different forms, such as a linear increase, step increase, exponential increase, and the like. The ramp up period can be of sufficient length (e.g., 5%-20% of the length of the period of silence) such that there is no increase in frame rate that would be jarring or distracting to the viewer. A similar approach can be used for the ramp down period to gradually transition from the compression speed to the playback speed. The type of ramp up or ramp down, and the length of the ramping period, can vary depending upon factors such as the type of content. For example, if the type of content is a demonstration or sporting event where it can be desirable to view the content then a more gradual ramping approach can be used. If the video content contains still images or slides, for example, then the length of the ramping period or type of adjustment can be adjusted accordingly since there will be little visible difference resulting from the rapid change in frame rate. Various other approaches can be used as well. As illustrated in the example frame rate lot 340 of FIG. 3C, there are periods in which the frame rate corresponds to the determined playback frame rate, which can be utilized during periods of audio signal that do not correspond to silence periods. During the periods of compression for the silent periods, respective periods 342, 344 of increased frame rate can be seen, where there is a gradual increase to the compression frame rate 346, then a gradual decrease towards the end of the compression period to the determined playback frame rate. It should also be mentioned that the types and/or lengths of the ramping periods can vary for different compression periods in the same media file, depending upon various characteristics of the media file.

As mentioned, in some embodiments the time codes for each compression cue can be determined in a first pass through the media file. A type of compression cue can also be stored for each of these time codes in order to comprehend why that time code was recorded. The time codes can then be used to generate a compressed version or presentation of the media file. As mentioned, in some embodiments the media file can be processed to generate a compressed version of the media file that can be stored by a content provided and provided to potential viewers as a compressed version of the media file. Such an approach can provide viewers with less control over the compression, as a viewer might only be able to select between a compressed version and a non-compressed version, but can require little dynamic compression on the server side at the time of streaming and less bandwidth to deliver to the client device to perform the presentation. Further, such an approach prevents the client device from having the resources and capability of performing the compression at the time of playback.

In some embodiments, the time codes and compression cue data can be stored with the media file, either as part of the file or in a related file or data set, which can be provided to the client device for use in generating the playback. The client device can then use the cues to adjust the frame rate or make other playback adjustments at the time of playback. For example, if the client device is displaying a multimedia file and the playback encounters a time code for which there is a compression cue, the media player (or other such application) can automatically adjust the frame rate accordingly, including adjustments for any ramp up or ramp down periods. Such an approach is advantageous for the content provider, as the provider only has to store and maintain one version of the media file that can be distributed to all potential viewers. Such an approach can also be advantageous to the viewer, as the viewer can have control over the amount of compression performed for the playback. This can include, for example, adjusting a compression frame rate value to which the frame rate will increase during a compression period, or adjusting a minimum length of time during which the audio must be within the silence value range before compression is initiated. This can be accomplished through dedicated settings, for example, or through an aggressiveness setting or compression control, such as a slider bar for adjusting the amount of compression to be performed, etc. Such an approach also enables a viewer to turn on/off compression or adjust during playback as appropriate. A company storing the file for multiple users can also store a single file and the individual users can adjust the amount of compression as appropriate for each user.

During the compression of the media playback, the frame rate of the video can be increased as mentioned. Increasing the speed of the audio playback during that period of time can be performed in some embodiments, although the increase in frequency of any background or ambient noise might be noticeable and/or distracting for at least some files. Accordingly, in some embodiments the audio playback can be cut out during that time period such that there is actual silence during that period. There can be ramp up and ramp down periods for the volume as well, such that there is no abrupt change in the audio levels at the beginning and end of the compression period. In some embodiments, a slight amount of buffer might be inserted between the end of the compression period and the start of the uncompressed audio content in order to prevent any drastic sudden increase in the audio signal level. In some embodiments the audio might be played at the normal speed, where video and audio channels are separately controllable, and then the audio might slowly be transitioned to the appropriate audio location towards the end of the compression period. This can include, for example, cutting out some of the audio content and doing a blending of audio before and after the cut to ease the transition. In still other embodiments there might be an ambient noise sample for that media file, determined during playback or otherwise, that can be played as needed during periods of compression. Various other approaches can be used as well within the scope of the various embodiments.

In some embodiments, the information learned through the media analysis process can be encoded into the media file during an encoding process, which can be performed as an online or offline encode. In such an approach, the analysis process could have involved a decoding and analysis of only the audio portion of the media file. During the encoding process the frame duration or frame rate can be adjusted based on the compression cues, or the compression cues can be encoded into the media file, among other such options. If the audio and video channel compression is handled separately, then separate encoding processes can be used as appropriate. Various other components in the media pipeline can utilize the time codes and/or compression cues to adjust the playback or media file as well.

In some embodiments the system will have a monotonically increasing time code based on the presentation time stamp (PTS) or decode time stamp (DTS). Some media players will allow for variable frame rate video based on these codes, while others will not. Such players may include a frame rate converter such that certain frame rates can be sampled and pushed out for playback at a constant frame rate regardless of the indicated input frame rate specified by the encoding. Other components in the media pipeline can reconcile decode time with presentation time as well, depending upon various factors and player settings, etc.

It might be the case that certain portions of the video playback contain content of interest to the user even when the audio track corresponds to substantial silence. This could be the case where, for example, a painter is painting specific brush strokes in a zoomed view or an athlete is performing a move that will subsequently be discussed, etc. Thus, in at least some embodiments the video content can be analyzed along with the audio content in order to determine an extent to which compression can be applied during any period of relative silence.

As an example, a period of video can be analyzed to determine one or more motion vectors which represent or estimate an amount of motion present over a period of time and/or between frames. Other comparison approaches can be used as well, such as to determine an extent to which pixel values change between frames. Based on any or all of these motion estimates or determinations, a type or amount of compression to apply can be determined that considers the video content as well as the audio content. For example, if the video content corresponding to a first period of silence shows almost no motion or pixel variation, then a maximum compression rate can be utilized since there will be no loss of detail in the video content. If the video content shows a lot of motion or change, such that there may be content displayed that is of interest to a viewer, then a reduced amount of compression (i.e., smaller frame rate adjustment) or even no compression might be applied over that period of the presentation. In some embodiments a viewer can indicate whether to compress periods that include motion or change, as well as how much compression to apply. In other embodiments this determination might be made automatically according to one or more applicable rules or policies. In some embodiments the frame rate can be adjusted during a period of silence based at least in part upon the amount of motion or change. For periods with a lot of motion there may be little compression, but the compression can increase as the amount of motion decreases, etc. Various other channels can be analyzed as well, such to analyze the amount of textual or supplemental content contained over a given period of the media file.

The amount of compression to apply can also be determined based at least in part upon other codes or metadata present in the media file. For example, some codes in a media file can indicate the presence of introductions, commercials, transitions, and other such content. As an example, a media stream might include SCTE 35 messages to signal the beginning or ending of an advertising period. The amount to compress the video during periods of silence can thus depend at least in part upon the type of content being displayed as determined using the tags or codes. Other tags such as national versus local or region-specific codes can be used as well.

In some embodiments, the types of signals used to locate compression cues can correspond to other types of audio (or video) signals as well. For example, periods of high amplitude or volume in the audio channel can be indicative of a period of commercial content, which can trigger a compression in some embodiments. In some embodiments the detection of music might trigger a compression, such as where the viewer is interested in dialog or spoken presentation and does not care about introductions or interludes, etc. In content where the user is actually interested in the periods of silence, such as where a golfer or chess player is lining up and swinging a club or contemplating then making a move, and less interested in the commentary, the detection of spoken words can trigger a compression. Various other sounds or signals can be used to trigger compression as well within the scope of the various embodiments.

Figure 4:
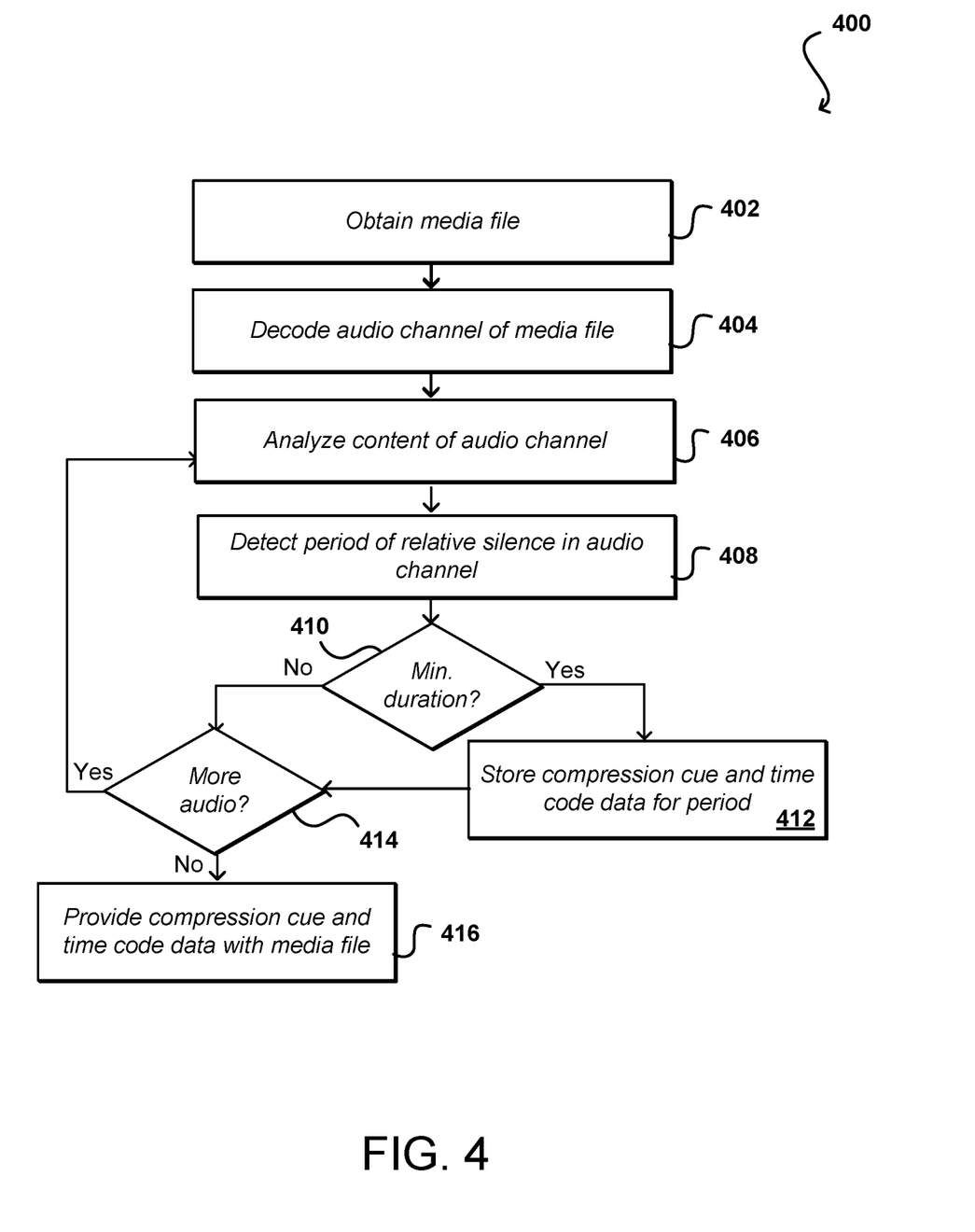
FIG. 4 illustrates an example process for analyzing a media file for compression cues that can be utilized in accordance with various embodiments.

FIG. 4 illustrates an example process 400 for locating compression cues in a media file that can be utilized in accordance with various embodiments. It should be understood that for any process herein there can be additional, fewer, or alternative steps performed in similar or alternative orders, or in parallel, within the scope of the various embodiments unless otherwise specifically stated. In this example, a media file is obtained 402 for which a compression option is to be provided. The file can be obtained in any appropriate way, such as by being generated by the party responsible for the analysis, obtaining from a customer, or receiving from a third party provider, among other such options. While the file can include any appropriate type(s) of media content, in this example the media file includes both an audio component and a video component, with the media file including sufficient information (e.g., time codes) to enable the audio and video components to be synchronized during playback. In some embodiments, the audio and video components can be contained in separate files before processing. In this example, the audio channel of the media file is decoded 404 using an appropriate decoding mechanism used for such purposes, although in some embodiments the audio as received may not require decoding. The content of the audio channel can be analyzed 406, in order to determine aspects of the audio channel over the playback period. These aspects can include, for example, the amplitude or frequency of the audio signal or a volume of the sound signal at a point along the playback timeline, among other such options.

In at least some embodiments the audio content can be analyzed by starting at a beginning point along the playback timeline and analyzing the audio content in order along the timeline until an end of the playback timeline. The aspects of the audio signal can be analyzed to determine locations where there is relative silence and locations where there is not relative silence. As mentioned, relative silence can comprise any location along the playback timeline where the amplitude, volume, or other aspect of the audio signal is below a silence threshold or within a silence range of amplitude values, etc. During the analysis, a period of relative silence can be detected 408 in the audio channel, where the audio channel satisfies the one or more silence criterion specified for the analysis. A determination can be made 410 as to whether the period of silence lasts for at least a minimum threshold amount of time. This can be, as mentioned, anywhere from around a few milliseconds to a few seconds in various embodiments. As mentioned, some embodiments may allow for a small amount of noise that falls outside the silence criterion as well. If the period of silence does not last for at least the minimum amount of time, then a determination can be made 414 as to whether there is more audio signal yet to process, and if so the analysis can continue. If the period of silence is determined to last for at least the minimum length of time, the compression cue data and/or time code data can be stored 412 for the period of silence. As mentioned, the time code data in this example can identify the beginning and end points of the period of silence, and the compression cue data can indicate whether each time code corresponds to a beginning or end point of the period of silence. In some embodiments the compression cue data can provide additional information as well, such as a length of the period of silence, a length of time since a previous period of silence, or other information that can be used to determine an amount and/or type of compression to apply for that period of silence. Various other types of information can be stored through the compression cue data as well. It should be noted that although the term "compression cue" is used, not all embodiments will require compression through frame rate increases or timing adjustments. As mentioned, some embodiments can utilize frame wipes or frame drops during the identified periods in order to handle periods of silence or other identified content (or lack of content). The analysis can continue until it is determined 414 that the entire audio signal has been analyzed, or another stop criterion is met, and the compression cue and time code data can then be provided 416 with, or for, the media file for purposes of determining compression to be applied to the media file.

Figure 5:
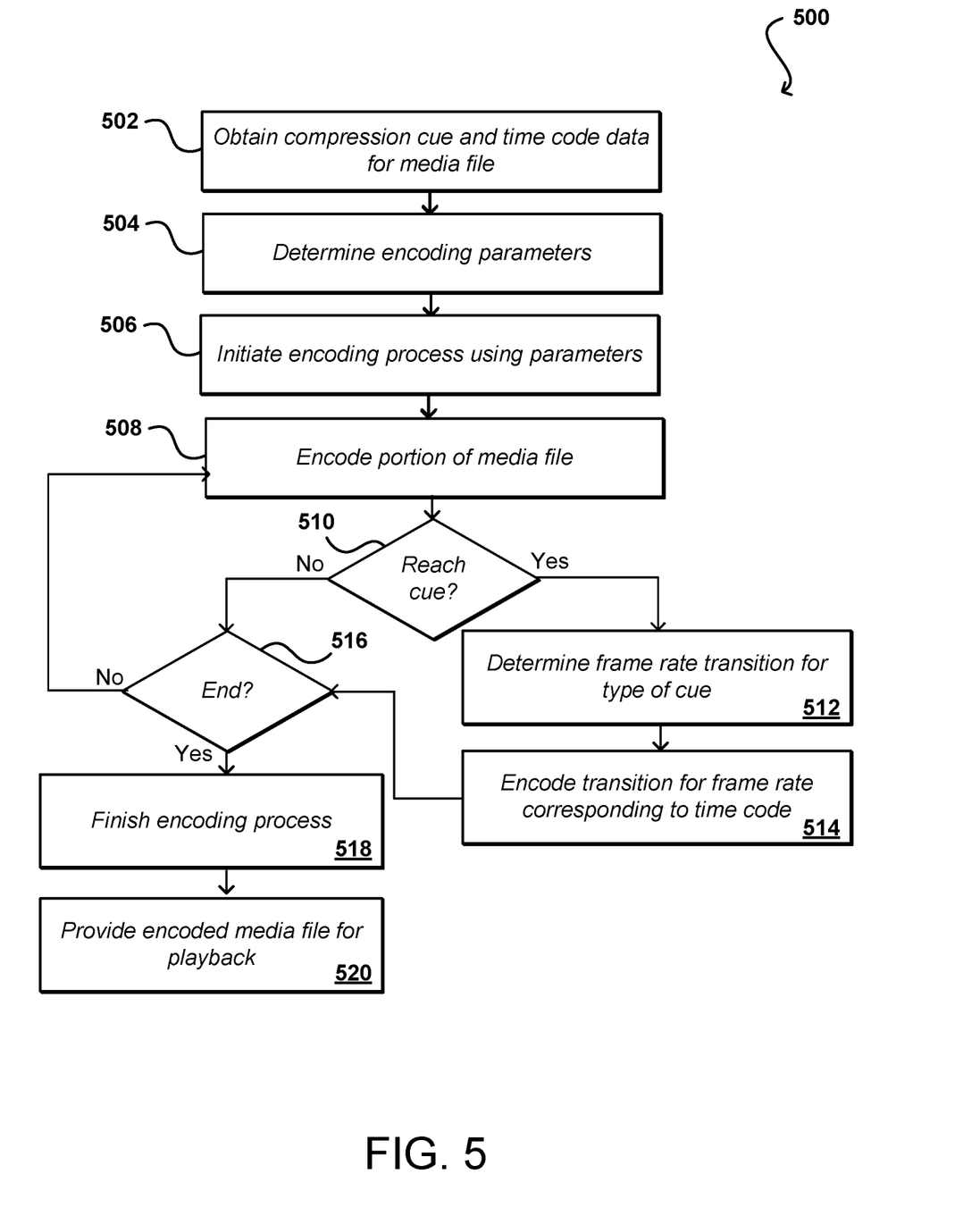
FIG. 5 illustrates an example process for selectively compressing portions of a media file based at least in part upon determined compression cues that can be utilized in accordance with various embodiments.

FIG. 5 illustrates an example process 500 for using the compression cue data to compress a media file that can be utilized in accordance with various embodiments. In this example, the compression cue and time code data for a media file is obtained 502, either by analyzing the media file and generating the data or by obtaining the data from another source. In this example, compression data will be encoded with the media file. Accordingly, any additional encoding parameters can be determined 504, as may relate to format or other encoding aspects, and the encoding of the media file can be initiated 506 using the determined encoding parameters. Approaches for encoding (or transcoding) a media file are well known and, as such, will not be discussed in detail herein. The process of encoding can involve encoding from an initial location along a playback timeline to a final location along the timeline in at least some embodiments. A portion of the media file can be encoded 508 during the process. During the processing of that portion, a compression cue can be reached 510 or otherwise encountered for a particular location in the media file. As mentioned, these can include various cues for various time codes, as may designate the beginning or end point of a period of silence or other period where compression or other adjustments may be advantageously applied.

For a given cue in the media file, the type of frame rate transition (or other adjustment) for the type of cue can be determined 512. This can include, for example, whether to go to an increased frame rate or to return to a standard frame rate for the type of content (as may also be indicated in the encoding parameters). The frame rate transition can also include information about the way in which the transition should occur, such as whether it should be a smooth linear or exponential transition, a length of time for the transition, etc. The information for the transition can then be encoded 514 into the media file and associated with the appropriate time code. When a media player then plays the media file and encounters the transition information, assuming the player supports such capability, the playback parameters can then be adjusted according to the transition data. As mentioned, in many instances this will involve increasing or decreasing the frame rate or speed with which the media file is played through the media player. If it is determined 516 that there is additional media to be encoded then the process can continue. Otherwise, the encoding process can finish 518 and the encoded media file can be stored and/or provided 520 for playback or other presentation.

Figure 6A:
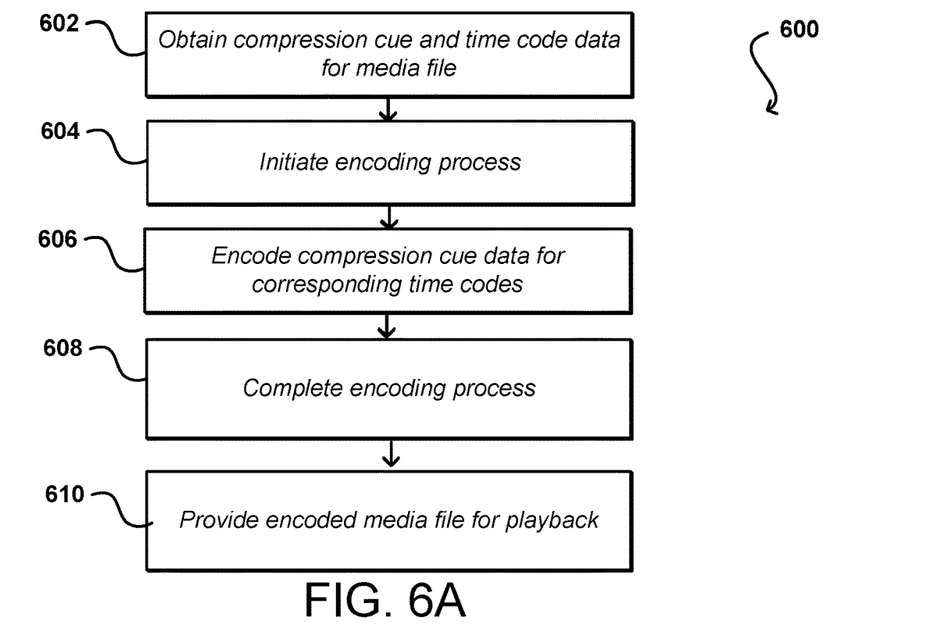
FIGS. 6A and 6B illustrate portions of an example process for determining portions of a media file for compression and then dynamically determining whether to apply a type of compression that can be utilized in accordance with various embodiments.

In some embodiments, the transition data may not be encoded in the media file to instruct a media player or other application how to transition playback. The compression cue data, or related information, may instead be encoded into the media file and the player can determine how to adjust playback. In other embodiments the compression cue can be provided as a separate file or dataset along with the media file, among other such options. As an example, the process 600 of FIG. 6A involves obtaining the compression cue and time code data for a media file similar to the process 500 discussed with respect to FIG. 5. The encoding process can then be initiated 604 using designated encoding parameters as discussed previously. In this example, however, the compression cue data is encoded 606 into the media file for the respective time codes, instead of including transition information or instructions. Thus, the encoded data might include data that a particular time code begins or ends a period of silence, and may provide information about the period of silence. A media player or other device or component playing the media file can then determine whether to adjust the playback based on the compression cue, as well as the type of any adjustment to be made. Information for each determined compression cue can be encoded in the media file until the encoding process is completed 608. The encoded media file can then be stored and/or provided 610 for playback or other presentation.

Figure 6B:
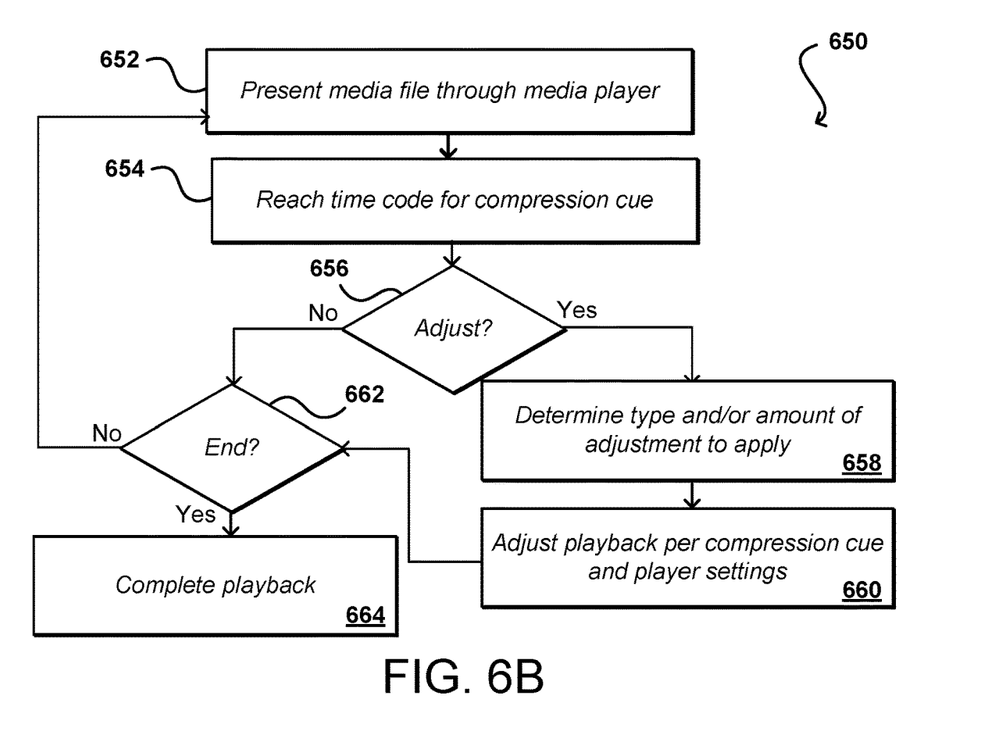

FIG. 6B illustrates a related process 650 wherein a media player, or other application, device, or process, can use the compression cue data to dynamically adjust playback in accordance with various embodiments. In this example, a media file can be presented 652 through the media file, such as by displaying video content through a display interface and presenting audio content through an audio playback device as known for such purposes. During the playback, a time code can be reached 654 or encountered that corresponds to a compression cue, whether encoded in the media file itself or separately provided. A determination can then be made 656 as to whether to adjust playback for that cue. The determination can be based on any of a number of different factors, which in at least some embodiments can depend upon the ability of the player to support playback adjustment in various ways based on specific factors. For example, the player might have default adjustments that are to be made for specific compression cues. For example, the player might adjust to 120 fps by default during a period of silence or other designated compression period. In some embodiments a viewer can select whether or not to apply a compression for a specific file or for any files played by the media player, and this selection can be changed by the viewer at any time, including during playback of a media file. In some embodiments a viewer or other entity might indicate the amount or type of compression to apply, such as by providing specific values or selections or by setting a slider or other input for compression level or aggressiveness, among other such options. The viewer in some embodiments can also specify the types of compression periods for which to apply compression. Based on these and/or other inputs or considerations, the media player (or a related component or process) can determine the type and/or amount of compression to be applied, and can then adjust 660 the playback per the compression cue data, player settings, and other such information. As mentioned, this can include an increase or decrease in frame rate, jump or wipe in playback, or other type of adjustment, within the scope of the various embodiments. The process can continue until it is determined 662 that the end of the media file has been reached, or another end criterion has been encountered (e.g., a user triggered a stop), at which point the playback can complete.

In some embodiments, the amount and/or type of compression to be applied for different compression cues or types of content can be learned and/or adjusted over time. For example, a player or system that is able to monitor interaction with the playback of a media file, such as when a user adjusts the playback by rewinding, turning off compression, adjusting a level of compression, etc. The amount of compression can be learned across users, for certain types of users, for specific users, for specific environments, for certain types of media or specific files, etc. A model of compression can be trained in some embodiments, and additional data used to update the model over time. Various computer learning models can be used, as may include decision tree algorithms, Bayesian algorithms, artificial neural network algorithms, and the like. The model can then be used to adjust the amount of compression, compression transition types and lengths, and other such aspects.

In some embodiments a user can have an option to switch between a compressed version of a media file and a non-compressed version. This can include multiple encodes in some embodiments, or can involve some type of signaling or instruction to switch between an original stream and a compressed stream at certain points, among other such options. In some embodiments a viewer might be able to select an option to switch back and forth between the compressed and non-compressed versions, while in other situations a media player or network management service might make a determination, such as where bandwidth or other resources may need to be conserved.

Figure 7:
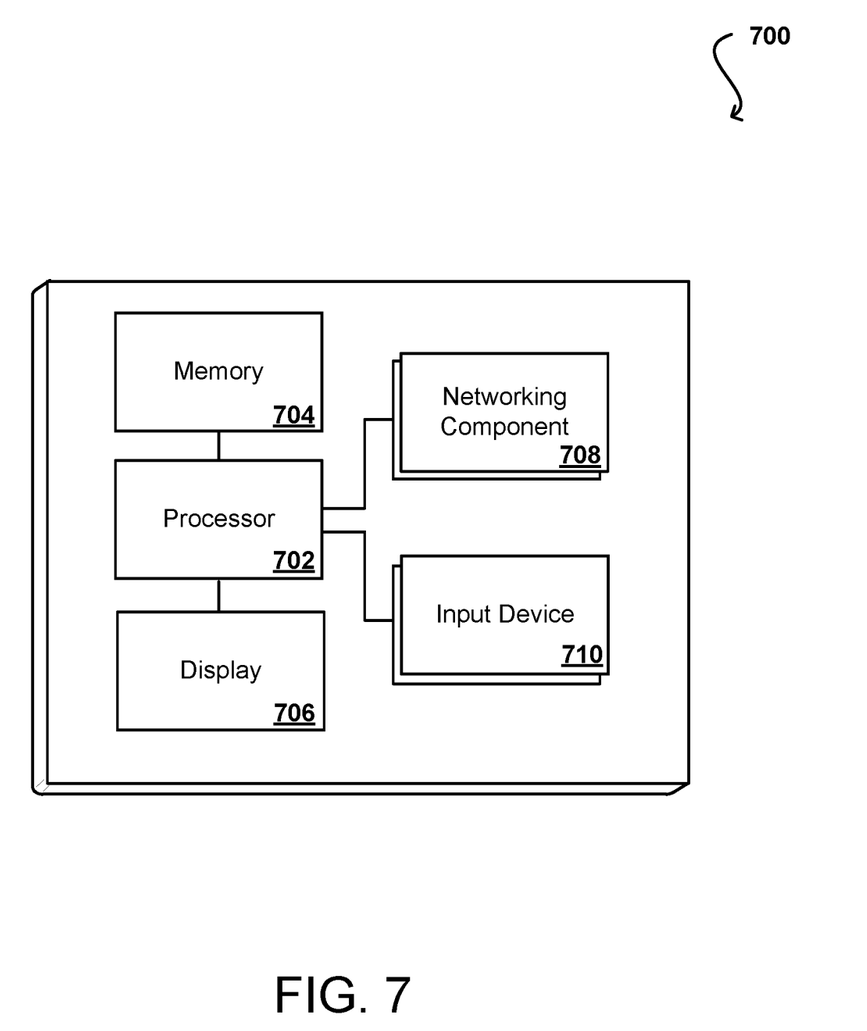
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   decoding audio data from a multimedia file;
   analyzing the audio data to determine a compression period, in the multimedia file, wherein the audio data satisfies at least one silence criterion;
   storing compression cues corresponding to the beginning and the end of the compression period, the compression cues each corresponding to a respective time code for the multimedia file;
   determining, during an encoding process for the multimedia file, a set of playback adjustments to be included with the encoded multimedia file, each playback adjustment corresponding to an adjustment in frame rate for playback of the multimedia file at one of the respective time codes;
   providing the encoded multimedia file, including the playback adjustments, for presentation via a media player; and
   causing the media player to, during playback of the encoded multimedia file, adjust a frame rate of the playback when the playback reaches a respective time code associated with one of the playback adjustments, wherein the frame rate of the playback is configured to be increased to a compression frame rate during the compression period.

2. The computer-implemented method of claim 1, further comprising:
   causing the frame rate for the playback to adjust from a default frame rate to the compression frame rate over a ramp up period near a beginning of the compression period; and
   causing the frame rate for the playback to adjust from the compression frame rate to the default frame rate over a ramp down period near an end of the compression period.

3. The computer-implemented method of claim 1, wherein the playback adjustments specify at least one of the compression frame rate, a length of the ramp up period, a length of the ramp down period, or a type of transition to be used between the default frame rate and the compression frame rate.

4. The computer-implemented method of claim 1, further comprising:
   identifying a determined period in the audio data where the audio data satisfies the at least one silence criterion, the at least one silence criterion including at least one of a maximum amplitude variation, a maximum frequency variation, or a maximum volume level over the determined period;
   determining that the determined period satisfies at least one minimum time length criterion; and
   designating the determined period as the compression period, the compression period configured to be one of a plurality of compression periods identified in the multimedia file.

5. A computer-implemented method, comprising:
   identifying a compression period of a multimedia file, the compression period satisfying at least one compression criterion with respect to at least one of audio data or video data from the multimedia file;
   storing compression cue data, for the compression period, associated with the multimedia file;
   receiving a request for the multimedia file; and
   providing the compression cue data with the multimedia file in response to the request, wherein a media player performing a playback of the multimedia file is configured to adjust a frame rate for a playback of the multimedia file during the compression period based at least in part upon the compression cue data.

6. The computer-implemented method of claim 5, further comprising:
   decoding audio data of the multimedia file; and
   analyzing the audio data to determine the compression period.

7. The computer-implemented method of claim 6, further comprising:
   identifying a determined period in the audio data where the audio data satisfies the at least one compression criterion;
   determining that the determined period satisfies at least one minimum time length criterion; and
   designating the determined period as the compression period, the playback period configured to be one of a plurality of compression periods identified in the multimedia file.

8. The computer-implemented method of claim 7, wherein the at least one compression criterion includes at least one of a maximum amplitude variation, a minimum amplitude variation, a maximum frequency variation, a minimum frequency variation, a maximum volume level, a minimum volume level, an audio pattern, a specified sound characteristic, or a type of signal present in the multimedia file.

9. The computer-implemented method of claim 5, further comprising:
determining one or more encoding parameters for the multimedia file; and
encoding the multimedia file per the one or more encoding parameters, wherein the encoded multimedia file includes the compression cue data.

10. The computer-implemented method of claim 5, further comprising:
causing, per the compression cue data, the frame rate for the playback to adjust from a default frame rate to a compression frame rate over a ramp up period near a beginning of the compression period; and
causing, per the compression cue data, the frame rate for the playback to adjust from the compression frame rate to the default frame rate over a ramp down period near an end of the compression period.

11. The computer-implemented method of claim 10, wherein the playback adjustments specify at least one of the compression frame rate, a length of the ramp up period, a length of the ramp down period, or a type of transition to be used between the default frame rate and the compression frame rate.

12. The computer-implemented method of claim 5, further comprising:
analyzing video content of the multimedia corresponding to the compression period;
determining an amount of variation in the video content over the compression period; and
determining the compression cue data based at least in part upon the amount of variation in the video content, wherein greater amounts of variation in the video content result in smaller amounts of adjustment to the playback of the multimedia file.

13. The computer-implemented method of claim 5, further comprising:
storing a second version of the multimedia file without the compression cue data, wherein a media player is configured to play back the multimedia file with or without the compression cue data.

14. The computer-implemented method of claim 5, further comprising:
enabling the playback of the multimedia file to be adjusted during the compression period by an amount or type specified for the media player.

15. A system, comprising:
at least one processor; and
memory including instructions that, when executed by the at least one processor, cause the system to:
analyze at least one media channel of multimedia content, the at least one media channel corresponding to at least one of audio data or video data of the multimedia content;
identify a compression period within the multimedia content, the compression period satisfying at least one compression criterion;
determine compression cue data for the compression period; and
cause a frame rate for a playback of the multimedia content to be adjusted during the compression period based at least in part upon the compression cue data.

16. The system of claim 15, wherein the instructions when executed further cause the system to:
decode audio data of the at least one media channel of the multimedia content;
identify a determined period in the audio data where the audio data satisfies the at least one compression criterion;
determine that the determined period satisfies at least one minimum time length criterion; and
designate the determined period as the compression period, the playback period configured to be one of a plurality of compression periods identified in the multimedia content.

17. The system of claim 16, wherein the at least one compression criterion includes at least one of a maximum amplitude variation, a minimum amplitude variation, a maximum frequency variation, a minimum frequency variation, a maximum volume level, a minimum volume level, an audio pattern, a specified sound characteristic, or a type of signal present in the multimedia content.

18. The system of claim 15, wherein the compression cue data includes at least one of a set of compression cues, a set of time codes, a type of the compression period, a compression frame rate, a length of an adjustment period, or a type of transition to be used between a default frame rate and the compression frame rate.

19. The system of claim 15, wherein the instructions when executed further cause the system to:
cause the compression cue data to be stored as a data set associated with the multimedia content or as data encoded within the multimedia content.

20. The system of claim 15, wherein the instructions when executed further cause the system to:
analyze video content of the multimedia corresponding to the compression period;
determine an amount of variation in the video content over the compression period; and
determine the compression cue data further based at least in part upon the amount of variation in the video content, wherein greater amounts of variation in the video content result in smaller amounts of adjustment to the playback of the multimedia content.

* * * * *